Sept. 3, 1935.  L. KARPILOFF  2,013,610
APPARATUS FOR MAKING SKINLESS SAUSAGES
Filed Oct. 3, 1934  3 Sheets-Sheet 1
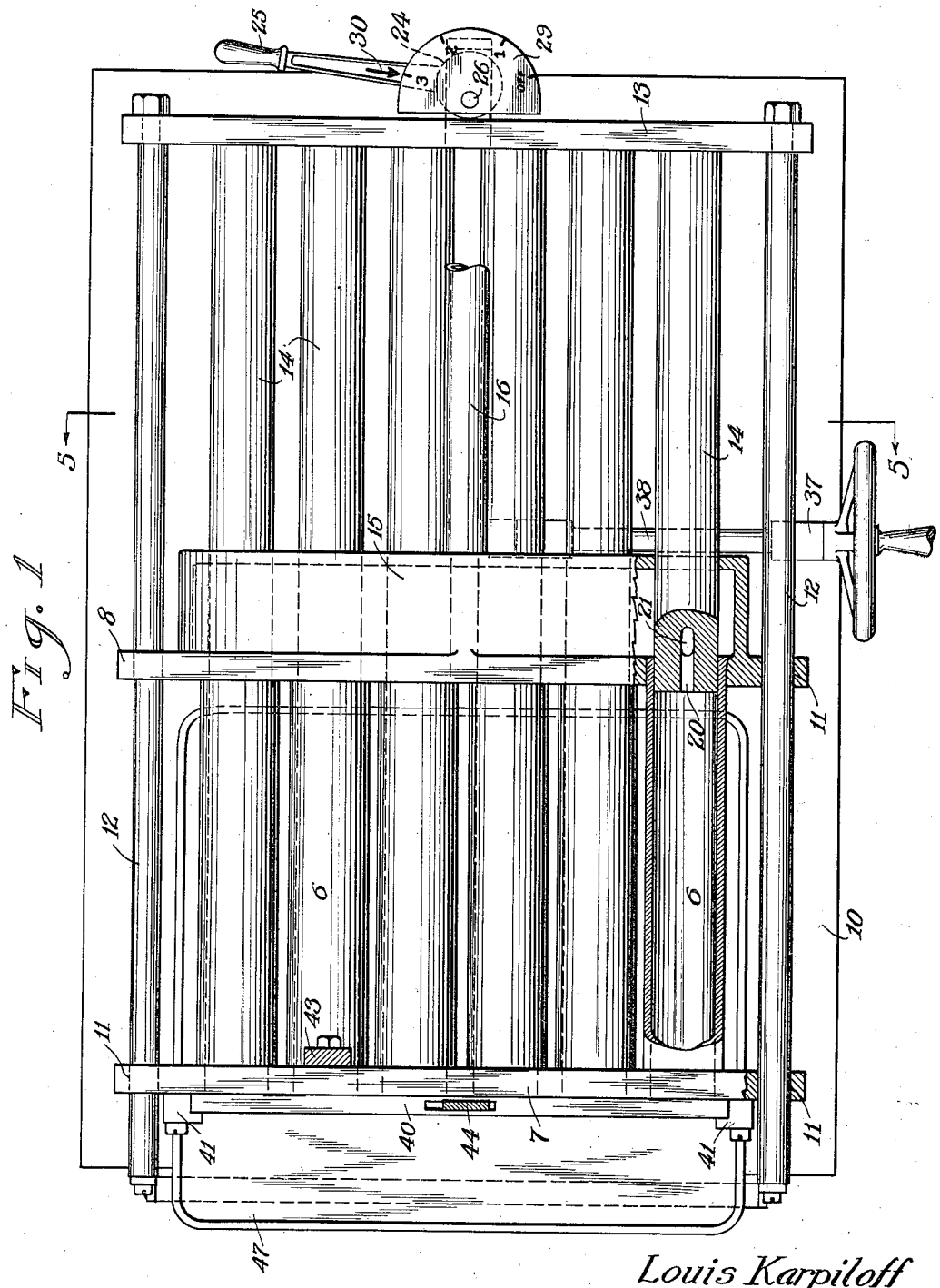
Louis Karpiloff
INVENTOR
BY Victor J.Evans&Co.
ATTORNEYS Sept. 3, 1935.  L. KARPILOFF  2,013,610
APPARATUS FOR MAKING SKINLESS SAUSAGES
Filed Oct. 3, 1934  3 Sheets-Sheet 2
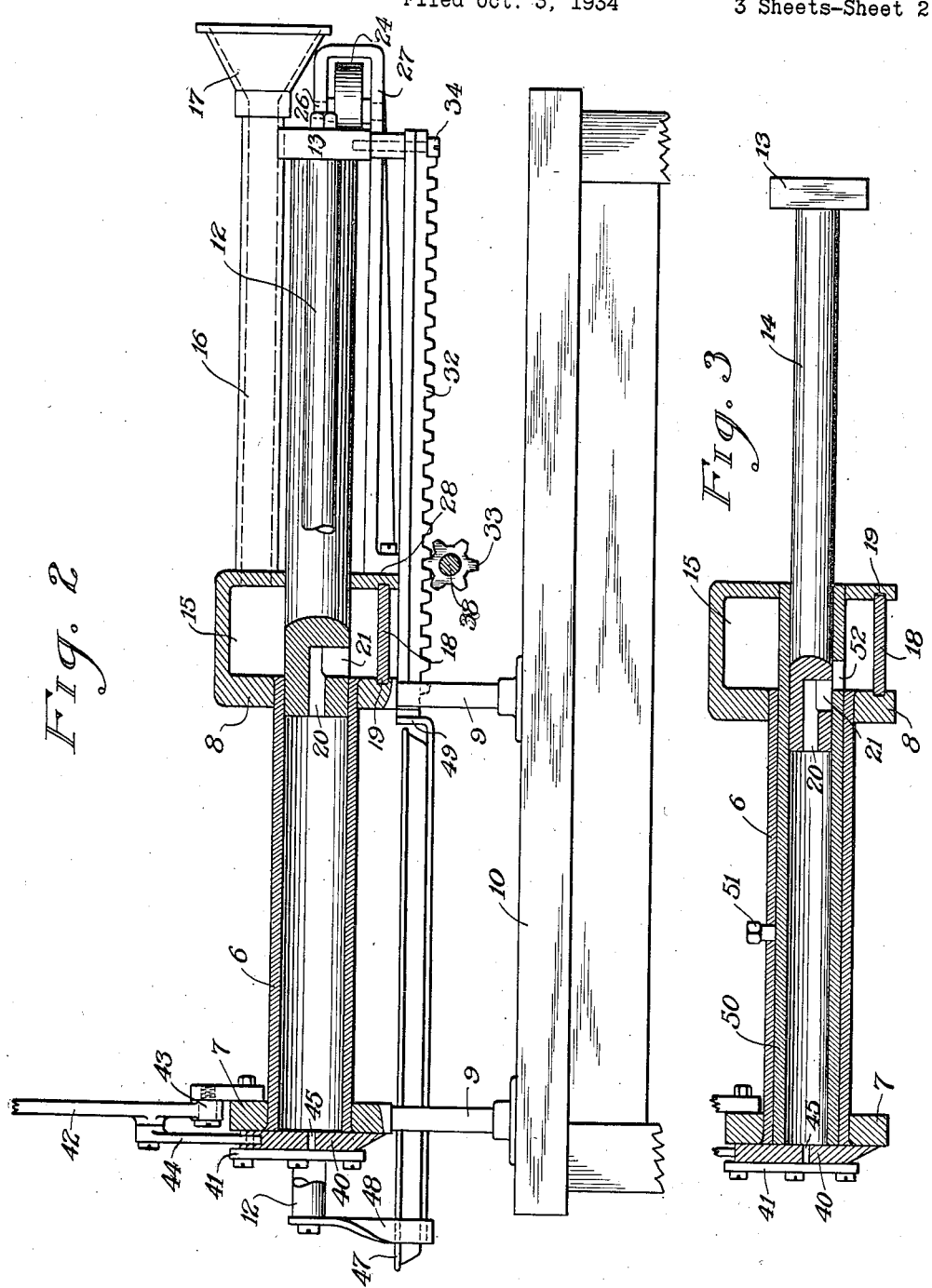
Louis Karpiloff
INVENTOR
BY Victor J. Evans & Co.
ATTORNEYS Sept. 3, 1935.   L. KARPILOFF   2,013,610
APPARATUS FOR MAKING SKINLESS SAUSAGES
Filed Oct. 3, 1934   3 Sheets-Sheet 3

Louis Karpiloff
INVENTOR

BY Victor J. Evans & Co.
ATTORNEYS

Patented Sept. 3, 1935

2,013,610

UNITED STATES PATENT OFFICE 2,013,610

APPARATUS FOR MAKING SKINLESS SAUSAGES

Louis Karpiloff, Brooklyn, N. Y.

Application October 3, 1934, Serial No. 746,754

7 Claims. (Cl. 17—32)

This invention relates to apparatus for the formation of skinless frankfurters and other similar meat products.

It is the primary object of my invention to provide a particularly simple and efficient machine for the quantity production of skinless sausages, frankfurters or hamburgers, which machine is particularly adaptable for easy cleaning and inspection.

A further object of my invention is to provide sausage forming apparatus adaptable for the manufacture of sausages of various sizes and which permits of the convenient change from one size to another without dismantling the machine.

Another object of my invention is to provide a machine of the character described which may be readily used in conjunction with the commercial meat filler and which will discharge the finished sausage forms onto a conveniently accessible receiving tray.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therein as do not affect the spirit of the invention nor exceed the scope thereof as expressed in the appended claims.

In the drawings:

Fig. 1 is a top elevational view of the entire machine with parts thereof broken away.

Fig. 2 is a side elevational view partly in central section.

Fig. 3 is a view similar to Fig. 2 but illustrating a modified form of my device.

In describing the invention in detail and the particular physical embodiment illustrating the invention, reference is had to the accompanying drawings wherein like characters of reference designate corresponding parts thruout the several views.

Figure 4:
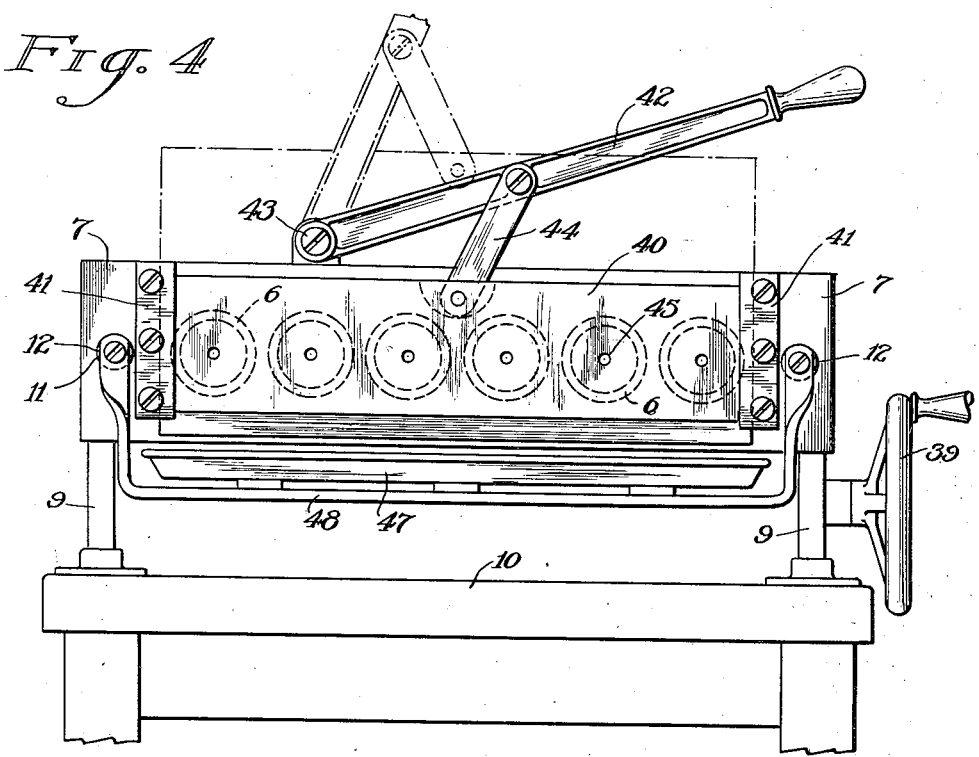
Fig. 4 is a front elevational view of the delivery end of the machine.
Figure 5:
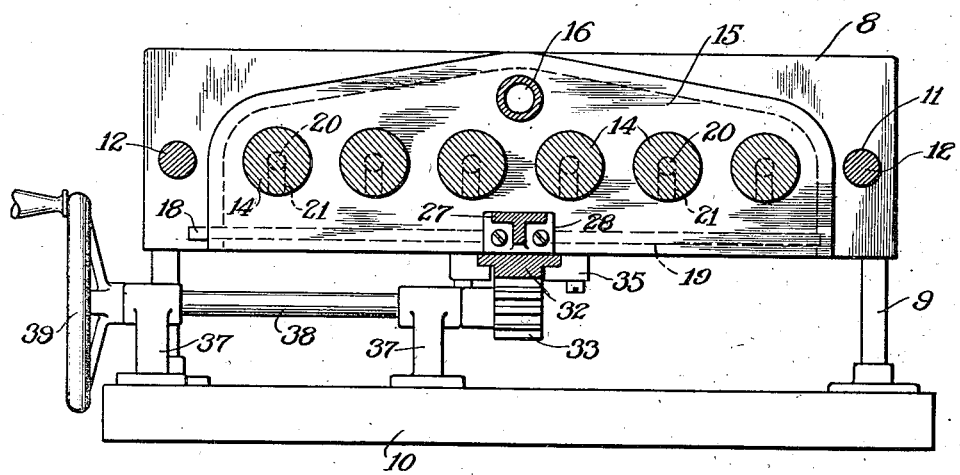
Fig. 5 is a transverse sectional view on line 5—5 of Fig. 1.

In the particular physical embodiment of my invention illustrated in the drawings my sausage forming apparatus comprises essentially a series of molds secured in spaced parallelism with each other and having a slidable closure at one end thereof, a series of plungers adapted to slide longitudinally into the molds, a meat receiving manifold in communication with the molds via apertures in the plungers and mechanical means to actuate and control the sliding of the plungers into and out of the forming molds.

The just mentioned forming molds are indicated by numeral 6, which molds are held in spaced parallelism with each other by having their respective ends securely fastened to the front cleat 7 and the rear cleat 8. The entire mold structure thus formed is rigidly mounted by stanchions 9 to a table 10 or other suitable structure. The ends of each of the cleats 7 and 8 are each provided with aligned apertures 11 into which are slidably mouned a pair of slide bars 12 which have their rear ends secured to a crosshead 13.

A series of cylindrical plungers 14 which are adapted to slide snugly into the molds 6 have their front ends partly inserted into said molds and are held in spaced parallel alignment by having their rear ends rigidly secured to the crosshead 13. Integral with the rear cleat 8 is constructed a meat distributing manifold 15 which surrounds a forward end portion of the plungers 14. Manifold 15 is connected by a meat supply pipe 16 and a coupling connection 17 to a meat filler or other apparatus by which the meat is delivered into the sausage forming machine.

To provide convenient access into the interior of manifold 15 for the cleaning and inspection of the machine, manifold 15 is provided at its lower portion with a sliding door 18 removably secured endwise of the manifold by the grooves 19. A port 20 is formed longitudinally in the end of each of the plungers 14 and communicates into the manifold 15 via the radial aperture 21, which aperture is elongate longitudinally of the plunger 14 for the purpose now described. In order to regulate the quantity of meat being delivered to the forming molds or to entirely shut off this supply, the plungers 14 are slid forward so that aperture 21 is partly constricted or entirely closed by its juxtaposition with the rear end of the respective forming tube 6. It is to be noted here that this position of plungers 14 into the forming tubes 6 may also effect the decrease in the length of the finished sausage. To effect this convenient and accurate adjustment of the plungers 14 and more particularly the position of the aperture 21 with relation to the molds 6, I have provided an eccentric cam 24 operable by its lever 25, the trunnions 26 of said cam being journalled in a bracket 27 rigidly secured to a stationary portion of the machine such as at 28 to the rear of manifold 15. In order to accurately indicate the position of aperture 21, a conveniently calibrated quadrant 29 is provided which, in conjunction with the arrow 30 on the handle 25, indicates this adjustment.

The finished sausage forms are delivered out of the forward end of the forming tubes 6 by sliding the plungers 14 forwardly into same. This movement is effected by a gear rack 32 and a pinion 33. The rear end of gear rack 32 is attached by screw 34 to the cross-head 13 and is slidably supported at its front end by slide blocks 35 secured to the rear cleat 8. Bearing brackets 37 provide rotational support for a pinion shaft 38 onto the inner end of which the pinion 33 is fixedly mounted. A hand wheel 39, being secured to the outer end of shaft 38, provides for the manual operation of the pinion 33.

Reference is now directed particularly to Fig. 4 which illustrates more clearly the delivery end of the machine. During the process of forming the sausages the ends of the forming tubes 6 are closed by the closure gate 40 being slidably mounted on the slide blocks 41 which are secured to the forward cleat 7. A gate operating lever 42 is fulcrumed onto cleat 7 at 43 and provides for the convenient operation of closure gate 40 in conjunction with the link 44. Gate 40 is provided with a series of apertures 45 in communication with the interior of the forming tubes 6 by which indication is made that the tubes are entirely filled with meat as evidenced by the discharge of a small amount of meat thru said apertures 45.

As previously described, the meat is delivered out of the forward end of the forming tubes, the gate 40 having been previously opened, by moving the plungers 14 into same. The finished sausages issuing out of the forming tubes are delivered onto a receiving tray 47 which is moved by its supports simultaneously with the plungers 14. In this fashion the meat is maintained in its desired formation. The movement of receiving tray 47 is effected by the fact that its supports 48 have their forward ends secured to the slide rods 12 and their rear portions fastened to the forward end of rack 32 as at 49.

The complete cycle of operation of my machine in formation of a number of sausages is as follows: The hand wheel 39 is turned to move the plungers 14 to their rearmost position, whence the lever 25 is set to regulate the aperture 21 to its desired opening. The gate 40 at the beginning of operations is of course closed. It is to be noted here that if lever 25 is to be used for the turning on of the meat supply from the manifold it is then set at off position and subsequently turned to the desired opening as soon as the filling process is to start. The sausage meat, having been previously suitably chopped or otherwise comminuted, is delivered under pressure to the manifold 15 via the coupling 17 and the tube 16. The meat then passes thru aperture 21 and port 20 into the forming tube 6. When the forming tube 6 has been completely filled the meat will indicate same by issuing out of the ports 45, at which time apertures 21 are closed by the operation of handle 25. The closure gate 40 is then raised and the plungers 14 are moved forwardly by the rotation of hand wheel 39 and the sausage forms are thus delivered onto the forwardly moving receiving tray 47.

In the modified construction of my apparatus, as illustrated in Fig. 3, provision is therein made by which the machine may be converted to the manufacture of the sausages of smaller sizes. In this instance the forming tubes 6 are of the same size as described for the previous form. The plungers 14 however are of a diameter to suit the formation of the smaller sausage. To accommodate the larger forming tube to the smaller size of the product an inner sleeve 50 is inserted into same, being securely held therein by the set screw 51. Inner sleeve 50 extends rearwardly thru the interior of the manifold 15 and terminates at the rear face of same. An aperture 52 permits of the entrance of the meat during the filling process into the aperture 21 and port 20. The conversion of the machine from its smaller size to the manufacture of larger sausages is effected by removing the sleeve 50 from within the forming tube 6 and placing same onto the plunger 14. However, in so doing the ends of sleeve 50 are to be reversed end for end so that the aperture 52 is now in registry with the aperture 21. Suitable means may be employed by which the sleeve 50 is securely held onto the plunger 14 so as to move with the same during its subsequent sliding operations.

What is claimed as new is:

1. In a machine of the character described, a series of tubes, means for opening and closing the outlet ends of said tubes, a series of movable plungers, one for each tube, adapted to express sausage from each tube, and a manifold around the inlet ends of said tubes and having a receiving aperture, said plungers having passageways leading from said manifold into the respective tubes.

2. In a machine of the character described, a series of tubes, means for opening and closing the outlet ends of said tubes, a series of movable plungers, one for each tube, adapted to express sausage from each tube, a manifold around the inlet ends of said tubes and having a receiving aperture, said plungers having passageways leading from said manifold into the respective tubes, and single operative means for reciprocating said plungers in said tubes.

3. In a machine of the character described, a series of tubes, means for opening and closing the outlet ends of said tubes, a series of movable plungers, one for each tube, adapted to express sausage from each tube, and a manifold around the inlet ends of said tubes and having a receiving aperture, said plungers having passageways leading from said manifold into the respective tubes, said means having small apertures in alignment with the outlet ends of the tubes.

4. In a machine of the character described, a series of tubes, means for opening and closing the outlet ends of said tubes, a series of movable plungers, one for each tube, adapted to express sausage from each tube, a manifold around the inlet ends of said tubes and having a receiving aperture, said plungers having passageways leading from said manifold into the respective tubes, and means for indicating that the tubes are full of meat.

5. In a machine of the character described, a series of tubes, a single means for opening and closing the outlet ends of said tubes, a series of movable plungers, one for each tube, adapted to express sausage from each tube, and a manifold around the inlet ends of said tubes and having a receiving aperture, said plungers having passageways leading from said manifold into the respective tubes.

6. In a machine of the character described, a series of tubes, means for opening and closing the outlet ends of said tubes, a series of movable plungers, reciprocable within said tubes and having terminal portions therein, one for each tube, adapted to express sausage from each tube, and a manifold around the inlet ends of said tubes and having a receiving aperture, said plungers having passageways leading from said manifold into the respective tubes.

7. In a machine of the character described, a series of tubes, means for opening and closing the outlet ends of said tubes, a series of movable plungers, reciprocable within said tubes and having terminal portions therein, one for each tube, adapted to express sausage from each tube, a manifold around the inlet ends of said tubes and having a receiving aperture, said plungers having passageways leading from said manifold into the respective tubes, and means for adjusting said plungers in the tubes to vary the rate at which the tubes are to be filled.

LOUIS KARPILOFF.